United States Patent [19]

Gruber et al.

[11] Patent Number: 5,614,126
[45] Date of Patent: Mar. 25, 1997

[54] SOLVENTLESS CURABLE RESIN COMPOSITION, IN PARTICULAR FOR THE FABRICATION OF PREPREGS

[75] Inventors: Urs Gruber, Arlesheim; Aloysius H. Manser, Allschwil, both of Switzerland

[73] Assignee: Ciba-Geigy Corporation, Tarrytown, N.Y.

[21] Appl. No.: 449,144

[22] Filed: May 24, 1995

Related U.S. Application Data

[62] Division of Ser. No. 964,311, Oct. 21, 1992.

[30] Foreign Application Priority Data

Oct. 28, 1991 [CH] Switzerland .................. 03146/91

[51] Int. Cl.$^6$ ...................................... C08F 20/00
[52] U.S. Cl. .................. 525/438; 525/507; 525/508; 525/533; 264/257; 264/258; 442/175; 528/92; 528/112; 528/357; 528/358; 528/409; 528/410; 528/412; 528/413; 528/414; 528/416
[58] Field of Search ...................... 525/438, 507, 525/508, 533; 264/257, 258; 528/92, 112, 357, 358, 409, 410, 412, 413, 414, 416; 428/236, 245, 286, 290

[56] References Cited

U.S. PATENT DOCUMENTS

| | | | |
|---|---|---|---|
| 4,920,182 | 4/1990 | Manser et al. | 525/438 |
| 4,963,300 | 10/1990 | Meier et al. | 264/22 |
| 5,073,438 | 12/1991 | Meier et al. | 428/224 |
| 5,130,406 | 7/1992 | Müller et al. | 528/92 |
| 5,179,179 | 1/1993 | Müller et al. | 526/90 |

FOREIGN PATENT DOCUMENTS

| | | |
|---|---|---|
| 0321407 | 6/1989 | European Pat. Off. |
| 0323584 | 7/1989 | European Pat. Off. |
| 0388837 | 9/1990 | European Pat. Off. |
| 0452263 | 10/1991 | European Pat. Off. |

OTHER PUBLICATIONS

IBM Technical Disclosure Bulletin, vol. 27, No. 5, Oct. 1984.

*Primary Examiner*—John C. Bleutge
*Assistant Examiner*—Randy Gulakowski
*Attorney, Agent, or Firm*—David R. Crichton; William A. Teoli, Jr.

[57] ABSTRACT

The invention relates to a substantially solventless curable resin composition, in particular for the fabrication of prepregs, which contains more than 45% by weight of substances which are solid at ambient temperature at least or at lower temperature, and which, in addition to comprising customary modifiers, comprises solid epoxy resins or a mixture of liquid and solid epoxy resins, at least one initiator which is sensitive to UV radiation for the polymerisation of the epoxy resins and has the formula I $$[R^1(Fe^{II}R^2)_a]^{ab\oplus} \; ab.[X]^{\ominus}, \qquad (I)$$

wherein a and b are each independently of the other 1 or 2, $R^1$ ist a π-arene, $R^2$ is a π-arene, an indenyl anion or a cyclopentadienyl anion, $[X]^{\ominus}$ is an anion $[LQ_m]^{\ominus}$ or the anion of a partially fluorinated or perfluorinated aliphatic or aromatic sulfonic acid, L is B, P, As or Sb, Q is F, with the proviso that some of the radicals Q may also be hydroxyl groups, and m is the valency of L increased by one, and at least one further compound which contains one or more than one carboxyl group, which composition, by heating to a temperature in the range from 60° to 140° C., excluding UV light and without the addition of a solvent, is convertible into a liquid state, and, by cooling to a temperature not exceeding ambient temperature and excluding UV light, can be convened from said liquid state into a solid composition which is chemically substantially still unchanged and has a softening point of −3° C. and higher, and which is tack-free or substantially tack-free at ambient temperature. Prepregs can be fabricated from these compositions in simple manner without the use of solvents.

8 Claims, No Drawings

SOLVENTLESS CURABLE RESIN COMPOSITION, IN PARTICULAR FOR THE FABRICATION OF PREPREGS

This is a divisional of Ser. No. 07/964,311, filed Oct. 21, 1992 pending.

The present invention relates to an essentially solventless curable resin composition, in particular for the fabrication of prepregs, to a process for the fabrication of prepregs and to the prepregs made from said resin composition.

By prepregs are meant fibre-reinforced materials which contain a curable resin composition and which can be processed to a composite by exposure to actinic radiation and/or by the application of heat, with or without contact with suitable further materials.

It is taught in EP-A-0 323 584 to fabricate prepregs by bringing a fibrous substrate into intimate contact either with a liquid solventless curable mixture that contains an epoxy resin and a compound of formula I

as hardener, or with a solution of a corresponding solid mixture in an inert solvent, and optionally drying the fibrous material impregnated with the curable mixture. Afterwards the prepregs can be further processed to fibrous composite structures, the procedure being that the curable mixture, after it has preferably first been exposed to actinic radiation, must be fully cured by applying heat. In formula I, a and b are each independently of the other 1 or 2, $R^1$ is a $\pi$-arene, $R^2$ is a $\pi$-arene, an indenyl anion or a cyclopentadienyl anion, $[X]^\ominus$ is an anion $[LQ_m]^\ominus$ or the anion of a partially fluorinated or perfluorinated aliphatic or aromatic sulfonic acid, L is B, P, As or Sb, Q is F, with the proviso that some of the radicals Q may also be hydroxyl groups, and m is the valency of L increased by one.

A considerable disadvantage of this process for making prepregs is that solid mixtures with which dry prepregs, and hence also prepregs with good storage properties, can be fabricated, are applied from an inert organic solvent as carrier, thereby necessitating a correspondingly troublesome and expensive procedure for the proper and, in particular, emission-free, drying of the prepregs. The liquid, solventless compositions disclosed, for example, in Examples 6 and 8 of the aforementioned patent specification, are suitable only for a continuous process in which the fibrous material impregnated with the curable mixture is further processed almost immediately to the composite. These liquid mixtures, however, do not make it possible to produce dry prepregs, as the liquid resin composition adhering to the fibrous material would first have to be converted into a solid state by a partial precure. Such a precure, also known as B-stage formation in prepregs technology, would require the use of a second hardener having a different reactivity. Moreover, only with great technical effort has it so far proved possible to control the formation of the B-stage such that prepregs with truly reproducible properties are obtained.

An additional drawback of the above described compositions is that, in the heat treatment, they require rather high temperatures to ensure a sufficiently complete cure. These compositions, even after exposure to actinic radiation—which usually results in a reduction of the cure temperature—still require temperatures in the range from 170° to 180° C. for a good cure. But such high temperatures result, inter alia, in a very high energy consumption or exclude the use of thermally less stable materials as components of composites, if the composites are to be fabricated from the cited prepregs.

EP-A-0 321 407 discloses thermally curable compositions based on epoxy resin and a compound of formula I as defined hereinabove, which compositions, after activation by actinic radiation, can also be cured in a substantially lower temperature range than 170°–180° C., typically at 100° C. In addition to the cited components, these compositions further contain a flexible polyester end-capped with on average two carboxyl groups per molecule and are suitable for use as adhesives and coating compositions. Those compositions are preferred which contain liquid epoxy resins in admixture with solid or semi-solid epoxy resins. Only the use of the compositions in liquid form or in the form of a solution, the drawbacks of which have been discussed above, can be inferred as application method from this patent specification.

It is the object of this invention to remedy the shortcomings of the prior art discussed above, i.e. to fabricate tack-free or substantially tack-free prepregs which are storable for an extended period of time and which furthermore can be fully cured at temperatures below c. 140° C., such that composites with good performance properties are obtained without the use of solvents and/or the necessity of a partial cure to obtain the B-stage.

Specifically, the invention relates to an essentially solventless curable resin composition, in particular for the fabrication of prepregs, which contains more than 45% by weight of substances which are solid at ambient temperature at least or at lower temperature, and which, in addition to comprising customary modifiers, comprises solid epoxy resins or a mixture of liquid and solid epoxy resins, at least one initiator which is sensitive to UV radiation for the polymerisation of the epoxy resins and has the formula I

wherein a and b are each independently of the other 1 or 2, $R^1$ ist a $\pi$-arene, $R^2$ is a $\pi$-arene, an indenyl anion or a cyclopentadienyl anion, $[X]^\ominus$ is an anion $[LQ_m]^\ominus$ or the anion of a partially fluorinated or perfluorinated aliphatic or aromatic sulfonic acid, L is B, P, As or Sb, Q is F, with the proviso that some of the radicals Q may also be hydroxyl groups, and m is the valency of L increased by one, and at least one further compound which contains one or more than one carboxyl group, which composition, by heating to a temperature in the range from 60° to 140° C., excluding UV light and without the addition of a solvent, is convertible into a liquid state, and, by cooling to a temperature not exceeding ambient temperature and excluding UV light, can be converted from said liquid state into a solid composition which is chemically substantially still unchanged and has a softening point of –3° C. and higher, and which is tack-free or substantially tack-free at ambient temperature.

The expression "essentially solventless" means that the novel compositions contain virtually no solvent, with the exception of very minor amounts (less than c. 2% by weight) of solvent which can often not be avoided because they are introduced by those modifiers which are normally obtainable in dissolved form, typically wetting agents.

The expression "liquid state" shall be understood in this context as meaning that the composition in this state, under normal or elevated pressure, is readily able to penetrate a fibrous material that is normally used for prepregs, typically glass fibres. In this case the viscosity of the composition may generally not be higher than 3 500 mPa.s. Preferred compositions are those which can be converted by heating to a temperature in the range from 60° to 140° C. into a state in which they have a viscosity not higher than 1200 mPa.s, preferably not higher than 600 mPa.s. However, the viscosity of the compositions should also not be too low at 60° C. A preferred lower limit for the viscosity is 200 m Pa.s, preferably 400 mPa.s.

By "ambient temperature" is meant the temperature prevailing at the locus where the composition is used without the use of a special cooling apparatus. Normally it will be in the range from 10° to 25° C.

The expression "composition which is tack-free or substantially tack-free at ambient temperature" means that, although the compositions may be slightly tacky, the degree of tack shall be so low that they can be easily stripped from the substrate to which they adhere. Slight tackiness is indeed often desirable, as prepregs made from such material in the still uncured state can be very easily fixed in a desired form. The softening point of the compositions is preferably higher than 0° C.

Suitable epoxy resins for the novel compositions are normally all epoxy resins containing on average at least two 1,2-epoxy groups in the molecule. N-Glycidyl compounds, however, very seriously impair the action of the initiators of formula I (catalyst poison) and are therefore only poorly suitable or entirely unsuitable. For toxicological reasons, triglycidyl isocyanurate and epoxy resins which contain epoxy groups within cycloaliphatic rings, such as bis(2,3-epoxycyclopentyl) ether, and which are used in conjunction with epoxy resins based on bisphenol A, are less preferred.

Very suitable epoxy resins for use in the invention are typically:

I) Polyglycidyl and poly(B-methylglycidyl) esters which are obtainable by reacting a compound containing at least two carboxyl groups in the molecule and epichlorohydrin or glycerol dichlorohydrin or B-methylepichlorohydrin. The reaction is conveniently carried out in the presence of a base.

Compounds containing at least two carboxyl groups in the molecule may suitably be aliphatic, cycloaliphatic or aromatic polycarboxylic acids. Examples of these polycarboxylic acids are listed below as components of polyesters suitable for use in this invention.

II) Polyglycidyl and poly(13-methylglycidyl) ethers which are obtainable by reacting a compound containing at least two free alcoholic hydroxyl groups and/or phenolic hydroxyl groups in the molecule with a suitably substituted epichlorohydrin, under alkaline conditions or in the presence of an acid catalyst and subsequent treatment with an alkali.

Ethers of this type are typically derived from acyclic alcohols containing at least 3, preferably at least 6, carbon atoms, for example poly(oxyethylene) glycols, poly(oxypropylene) glycols, 1,4-butanediol, poly(oxytetramethylene) glycols, 1,6-hexanediol, 2,4,6-hexanetriol, glycerol, 1,1,1-trimethylolpropane, pentaerythritol, sorbitol, as well as from polyepichlorohydrins. They may also be derived from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene.

The epoxy compounds may also be derived from mononuclear phenols such as resorcinol or hydroquinone, or they are based on polynuclear phenols such as bis(4-hydroxyphenyl)methane bisphenol F, 4,4'-dihydroxydiphenyl, bis(4-hydroxyphenyl)sulfone, 1,1,2,2-tetrakis(4-hydroxyphenyl)ethane, 2,2-bis(4-hydroxyphenyl)propane (bisphenol A), 2,2-bis(3,5-dibromo-4-hydroxyphenyl)propane and on novolaks obtainable by condensation of aldehydes such as formaldehyde, acetaldehyde, chloral or furfuraldehyde with phenols, preferably phenol or cresol, or with phenols which are substituted in the nucleus by chlorine atoms or $C_1$–$C_9$ alkyl groups, typically 4-chlorophenol, 2-methylphenol or 4-tert-butylphenol, or are obtainable by condensation with bisphenols, as described hereinabove.

III) Poly(S-glycidyl) compounds, preferably bis(S-glycidyl) derivatives which are derived from dithiols or bis(4-mercaptomethylphenyl) ether.

It is also possible to use epoxy resins in which the 1,2-epoxy groups are attached to different hetero atoms or functional groups. These compounds typically comprise the glycidyl ethers-glycidyl esters of salicylic acid.

These epoxy resins are known per se or can be prepared by known processes.

The novel compositions normally comprise 60 to 98% by weight of epoxy resins, preferably 75 to 98% by weight, typically 80 to 90% by weight. The amount of solid epoxy resin is preferably 50% by weight, based on the total weight of the epoxy resins, and greater, typically greater than 60% by weight or 70% by weight. It is also possible to use only solid epoxy resins if these have a sufficiently low softening temperature (usually below 140° C.).

A mixture of liquid and solid epoxy resins, which forms an essential component of the novel compositions, may be a mixture of one or more than one liquid epoxy resin with one or more than one solid epoxy resin.

Especially preferred compositions are those which contain either glycidyl esters or diglycidyl ethers which are derived from bisphenol A or bisphenol F. Preferred compositions are also those which contain polyglycidyl ethers which are derived from bisphenol A, bisphenol F or from epoxy novolaks, preferably epoxy phenol and epoxy cresol novolaks.

Suitable π-arenes $R^1$ and $R^2$ for the compounds of formula I are preferably carbocyclic-aromatic hydrocarbons of 6 to 24, preferably 6 to 12, carbon atoms, or heterocyclic-aromatic hydrocarbons of 4 to 11 carbon atoms and one or two sulfur and/or oxygen atoms, which groups may be substituted by one or more than one, preferably by one or two, identical or different monovalent substituents such as halogen atoms, preferably chlorine or bromine atoms, or $C_1$–$C_8$alkyl, $C_1$–$C_8$alkoxy or phenyl groups. These π-arene groups may be mononuclear, fused mononuclear or non-fused polynuclear systems, in which last mentioneed systems the nuclei may be bonded direct or through linking groups such as —$CH_2$—, —$C(CH_3)_2$—, —O—, —S—, —$SO_2$—, —CO— or —CH=CH—. $R^2$ can also be an indenyl anion and, preferably, a cyclopentadienyl anion, which anions may also be substituted by one or more than one, preferably by one or two, identical or different monovalent substituents, such as those mentioned above as substituents of π-arenes. The alkyl or alkoxy substituents may be straight-chain or branched. Typical alkyl or alkoxy substituents are methyl, ethyl, n-propyl, isopropyl, n-butyl, sec-butyl, tert-butyl, n-pentyl, n-hexyl and n-octyl, methoxy, ethoxy, n-propoxy, isopropoxy, n-butoxy, n-hexyloxy and n-octyloxy. The alkyl and alkoxy groups of 1 to 4 and, especially, 1 or 2 carbon atoms in the alkyl moieties are preferred. Preferred substituted π-arenes or substituted indenyl or cyclopentadienyl anions are those which carry one or two of the aforementioned substituents, preferably methyl, ethyl, n-propyl, isopropyl, methoxy or ethoxy groups. π-Arenes $R^1$ and $R^2$ may be identical or different.

Suitable π-arenes are typically benzene, toluene, xylenes, ethylbenzene, cumene, methoxybenzene, ethoxybenzene, dimethoxybenzene, p-chlorotoluene, m-chlorotoluene, chlorobenzene, bromobenzene, dichlorobenzene, trimethylbenzene, trimethoxybenzene, naphthalene, 1,2-dihydronaphthalene, 1,2,3,4-tetrahydronaphthalene, methylnaphthalene, methoxynaphthalene, ethoxynaphthalene, chloronaphthalene, bromonaphthalene, biphenyl, stilbene, indene, 4,4'-dimethylbiphenyl, fluorene, phenanthrene, anthracene, 9,10-dihydroanthracene, triphenyl, pyrene, perylene, naphthacene, coronene, thiophene, chromene, xanthene, thioxanthene, benzofuran, benzothiophene, naphthothiophene, thianthren, diphenylene oxide and diphenylene sulfide.

Typical anions of substituted cyclopentadienes are the anions of methyl-, ethyl-, n-propyl- and n-butylcyclopentadiene or the anions of dimethylcyclopentadiene. Preferred anions are the anion of unsubstituted indene and, most preferably, of unsubstituted cyclopentactiene.

The index a is preferably 1. The index b is preferably 1. If a is 2, $R^2$ is preferably the unsubstituted or substituted indenyl anion or, most preferably, the cyclopentadienyl anion.

$X^\ominus$ is preferably the anion of a perfluorinated aliphatic or perfluorinated aromatic sulfonic acid and, most preferably, $[LQ_m]^\ominus$, as defined above.

Typical anions of perfluorinated aliphatic or perfluorinated aromatic sulfonic acids are $CF_3SO_3^\ominus$, $C_2F_5SO_3^\ominus$, $n-C_3F_7SO_3^\ominus$, $n-C_4F_9SO_3^\ominus$, $n-C_6F_{13}SO_3^\ominus$, $n-C_8F_{17}SO_3^\ominus$, $C_6F_5SO_3^\ominus$ and $CF_3C_6F_4SO_3^\ominus$.$CF_3SO_3^\ominus$ is preferred.

Typical examples of especially preferred anions $[LQ_m]^\ominus$ are $PF_6^\ominus$, $AsF_6^\ominus$, $SbF_6^\ominus$ and $SbF_5(OH)^\ominus$. Particularly preferred anions are $PF_6^\ominus$ and $SbF_6^\ominus$, most preferably $SbF_6^\ominus$. Compositions which contain compounds of formula I containing $SbF^\ominus_6$ as anion can be fully cured at very low temperatures after their deblocking by irradiation.

The compounds of formula I are known per se or can be prepared by methods analogous to those for obtaining known compounds. The preparation of the salts in which $X^\ominus=[LQ_m]^\ominus$ is described in EP-A-94 915. Compounds of formula I containing other anions can be prepared by processes which differ from those described therein by introducing in place of an anion of a complex acid another anion of acid HX, wherein X is as defined above, in a manner known per se.

In some cases it may be especially advantageous to use novel compositions which contain more than one iron arene compound of formula I, which compounds each contain different anions[$X^\ominus$]. Typical examples are mixtures of iron arene salts based on the anions $SbF_6^\ominus$ and $CF_3SO_3^\ominus$ and, in particular, based on $PF_6^\ominus$ and $SbF_6^\ominus$. Such mixtures make possible an optimum control of the curing conditions of novel compositions and the properties of cured products which are made from the compositions.

The total content in the compositions of compounds of formula I is normally from 0.5 to 10% by weight, preferably from 1 to 5% by weight.

Compounds which contain one or more carboxyl groups may suitably be customary low molecular carboxylic acids. The carboxylic acids may be solid and liquid at ambient temperature. They preferably have a molecular weight of 45 to 250 g, most preferably 45 to 100 g, per carboxyl equivalent. Suitable carboxylic acids are lactic acid (liquid at ambient temperature) or benzoic acid, salicylic acid, oxalic acid, malonic acid, succinic acid, glutaric acid, adipic acid, pimelic acid, malic acid, tartaric acid, maleic acid, fumaric acid. Particularly preferred carboxylic acids are lactic acid, adipic acid and fumaric acid.

Further very suitable compounds are the polyesters which carry free carboxyl groups, especially those end-capped with on average at least two carboxyl groups, and which are described in EP-A-0 321 407. Greatly enhanced bonding properties are also obtained, inter alia, with these last mentioned polyesters. The polyesters may be fluid, semi-solid or solid at ambient temperature, and they may be amorphous or partially crystalline. Their softening point is preferably below 100° C. and they have as a rule molecular weights (number average) from 250 to 15 000, preferably from 500 to 2 500. They normally have an acid number of 0.1 to 5 eq/kg, preferably of 0.1 to 2.0 eq/kg. The viscosity (according to Epprecht) of these polyesters is usually lower than 2000 mPa.s (at 80° C.).

The polyesters are derived from aliphatic or cycloaliphatic polyols and aliphatic, cycloaliphatic or aromatic polycarboxylic acids.

In the case of polyols it is preferred to use low molecular and prepolymer builder components.

Typical examples of low molecular aliphatic diols are α,ω-alkylenediols such as ethylene glycol, 1,2-propanediol, 1,3-propanediol, 1,4-butanediol, 1,5-pentanediol, neopentyl glycol, 1,6-hexanediol, 1,8-octanediol, 1,10-decanediol or 1,12-dodecanediol. Typical examples of low molecular cycloaliphatic diols are 1,3- or 1,4-dihydroxycyclohexane, 1,4-cyclohexanedimethanol, bis(4-hydroxycyclohexyl)methane or 2,2-bis(4-hydroxycyclohexyl)propane. Typical low molecular higher functional alcohols are 1,1,1-trimethylolethane, 1,1,1-trimethylolpropane, glycerol, pentaerithritol or 1,3,5-trihydroxybenzene.

Prepolymer builder components will be understood as meaning in general hydroxyl-terminated prepolymers containing at least two repeating flexibilising structural components. Typical examples are hydroxyl-terminated polyethers based on polypropylene and polybutylene glycol as well as hydroxyl-terminated polycaprolactones. The molecular weight (number average) of these prepolymers is usually 150–4000, preferably 500–2 500. Prepolymer builder components may be bifunctional or higher functional, preferably bifunctional or trifunctional. Low molecular builder components are often bifunctional. The polyesters, however, may also contain low molecular higher functional builder components, preferably in a minor amount. In all these embodiments, the type, functionality and amount of higher functional components must be so chosen that a polyester of the specifications indicated above is formed.

Exemplary of suitable hydroxy-terminated prepolymers containing at least two repeating flexibilising structural units are polyethers, polyesters or polythioethers, provided these compounds are hydroxyl-terminated. Representative examples of hydroxyl-terminated polyethers are polyalkylene ether polyols which are obtained by ionic polymerisation, copolymerisation or block copolymerisation of alkylene oxides such as ethylene oxide, propylene oxide or butylene oxide, in the absence or presence of di- or polyfunctional alcohols like 1,4-butanediol, 1,1,1-trimethylolethane, 1,1,1-trimethylolpropane, 1,2,6-hexanetriol, glycerol, pentaerythritol or sorbitol, or of amines such as methylamine, ethylene diamine or 1,6-hexanediamine, or by ionic polymerisation or copolymerisation of cyclic ethers like tetrahydrofuran, ethylene oxide or propylene oxide with acid catalysts like $BF_3$.etherate, or by polycondensation of glycols which can be polycondensed with the elimination of water, typically 1,6-hexanediol, in the presence of an acid etherification catalyst like p-toluolsulfonic acid. It is also possible to use oxalkylation products of phosphoric acid or phosphorous acid with ethylene oxide, propylene oxide or butylene oxide. Typical hydroxyl-terminated polyester polyols are compounds which are derived from dicarboxylic and/or polycarboxylic acids and diols and/or polyols, preferably from dicarboxylic acids and diols. Typical examples of suitable polyols and polycarboxylic acids are those cited herein as builder components for the polyesters. Further examples of hydroxyl-terminated prepolymers are polymerisation products of lactones, typically of ε-caprolactones; or polyalkylene thioether polyols, typically the polycondensation products of thiodiglycol with itself and with diols and/or polyols, including 1,6-hexanediol, triethylene glycol, 2,2-dimethyl-1,3-propanediol or 1,1,1-trimethylolpropane. These compounds are known to those skilled in the art. They may be linear or branched; the linear types are preferred.

Illustrative examples of aliphatic dicarboxylic acids which can be used as builder components of polyesters suitable for use in this invention are saturated aliphatic dicarboxylic acids like oxalic acid, malonic acid, succinic acid, α-methylsuccinic acid, glutaric acid, adipic acid, pimelic acid, azelaic acid, sebacic acid or dimerised linoleic acid; or unsaturated aliphatic polycarboxylic acid like maleic acid, fumaric acid, mesaconic acid, citraconic acid, glumconic acid or itaconic acid, as well as possible anhydrides of these acids. Typical cycloaliphatic dicarboxylic acids are hexahydrophthalic acid, hexahydroisophthalic acid or hexahydroterephthalic acid, tetrahydrophthalic acid, hexahydroisophthalic acid or hexahydroterephthalic acid or 4-methyltetrahydrophthalic acid, 4-methylhexahydrophthalic acid or endomethylenetetrahydrophthalic acid. Aromatic dicarboxylic acids are typically phthalic acid, isophthalic and terephthalic acid. Exemplary of higher functional carboxylic acids are aromatic tri- or tetracarboxylic acids such as trimellitic acid, trimesic acid, pyromellitic acid or benzophenonetetracarboxylic acid; or trimerised fatty acids or the mixtures of dimerised and trimerised fatty acids which are commercially available under the registered trademark Pripol®.

Preferred polyols are hexanediol, neopentyl glycol or cyclohexane dimethanol or combinations thereof. Preferred polycarboxylic acids are α,ω-dicarboxylic acids containing aliphatic segments, for example adipic or sebacic acid.

The polyesters are prepared in a manner known per se by reacting the polyol component or components with an excess of polycarboxylic acid component or components. A polyester forming derivative, for example an anhydride, can also be used instead of the polycarboxylic acid. Another mode of synthesis comprises condensing polyol and polycarboxylic acid (or derivative thereof), using an excess of polyol. The hydroxyl group containing prepolymer so obtained is then end-capped with a carboxylic anhydride to give the carboxyl-terminated polyester. It is also possible to make a start from the other hydroxyl-terminated prepolymers described above and to end-cap them with suitable carboxylic anhydrides.

The polyester resins can be prepared by methods commonly used in the art for the preparation of such resins. Thus the esterification can be carried out conveniently by melt condensation of the carboxylic acid component or components and the diol. The reactants are typically heated, with stirring, to temperatures of up to 250° C. It may be useful to pass an inert gas, conveniently nitrogen, through the reaction mixture in order to remove the water formed during the esterification. At the conclusion of the esterification reaction a slight vacuum can also be applied to isolate residual low molecular fission products. The preferred temperature range of the melt condensation is 160°–250° C. Other forms of polycondensation may also be used, including interfacial polycondensation, polycondensation in solution, in suspension or in the mass. The condensation of polycarboxylic acids and/or polyols having functionalities greater than two is carried out in a manner known to those skilled in the an under conditions and in stoichiometric ratios so that gelation is prevented and the polyester is branched.

The novel compositions will normally contain 0.2 to 25% by weight of the compounds containing one or more than one carboxyl group. For the aforementioned low molecular carboxylic acids 10% by weight will almost always suffice. In this case an amount of 0.5 to 5% by weight is preferred. Ordinarily a greater amount of higher molecular weight compounds, e.g. the cited polyesters, must be used, as these compounds usually contain fewer carboxyl equivalents, based on the amount of the compounds. In these cases an amount of 10 to 25% by weight is preferred.

The curable compositions may also contain further known modifiers which are commonly employed in the an of radiation and heat curable materials. Such materials are typically pigments, dyes, flame retardants, antistatic agents, flow control agents, antioxidants, adhesion promoters, plasticisers, wetting agents, thixotropic agents, light stabilisers, often also fillers.

Further objects of the invention are a process for the preparation of prepregs, which comprises the use of the above described compositions, and pregregs comprising a fibrous material and a novel composition as curable composition.

This process comprises heating a novel composition, excluding UV light, to a temperature which is in the range from 60° to 140° C. and is at least sufficiently high that the composition has a viscosity not higher than about 3 500 mPa.s, preferably not higher than 1 200 mPa.s, bringing said composition into intimate contact in this state with a fibrous material, still exluding UV light, cooling the so treated fibrous material, excluding UV light, to at least a temperature at which the curable composition solidifies, and activating the material so obtained either after temporary storage, excluding UV light, or immediately by exposure to UV radiation.

Suitable fibrous materials are quite generally all materials which are able to form a composite with the epoxy matrix and which effect a reinforcement of the matrix material. Typical fibrous materials are natural polymers like cellulose; metal fibres, e.g. of steel, Ti, W, Ta or Mo; glass and ceramic fibres; organic fibre-forming polymers, especially aromatic polyamides such as Nomex or Kevlar; and also carbon fibres, e.g. materials made by carbonising cellulose, polyacrylonitrile or pitch.

The fibrous materials may be used as substrates in any form. They may be used typically as continuous filaments (capillary filaments or strands), endless yarns, parallel rovings, woven continuous yarns, spun rovings, woven roving fabrics, milled fibres, continuous strand mats, chopped strand mats, bonded fabrics or felts (papers).

Contacting the fibrous material with the curable resin composition will differ from one type of fibre to another. Thus, for example, prepregs which contain milled fibres can be fabricated by applying the fluid, hot, curable compositon together with chopped fibres to a woven fabric or a metal foil. A preferably flexible substrate can also initially be coated with the hot, fluid composition and the fibrous material incorporated at a later site where the coating is still sufficiently fluid with a press roll, after which the substrate is removed. Doctor coating is also possible. For this type of application and for similar ones the viscosity of the hot novel compositions will preferably be from 3 500 to 1 200 mPa.s. Contacting the fibrous material with the curable composition can also be performed by impregnating woven fabrics, bonded fabrics or continuous filaments with a curable composition heated to fluidity, as intended in accordance with the practice of this invention, in which case the webs of fibrous material are typically impregnated in a bath of the hot composition. During impregnation, the novel compositions shall preferably have a viscosity of 1 200 to 200 mPa.s and a temperature typically in the range from 100° to 120° C. A preferred process of this kind is the filament winding technique described in more detail in Example 5.

During processing, the temperature of the novel compositions may readily be increased to well above 100° C. in order to adjust the required viscosity to not higher than 3 500 mPa.s or to a viscosity of preferably not higher than 1 200 mPa.s. So long as the temperature is kept below c. 140° C., there is usually no danger of a (partial) premature cure of the resin composition and, after the subsequent cooling, a composition is obtained which, at ambient temperature, is dry, barely tacky and solid and is chemically substantially still in unchanged form. Cooling is preferably to ambient temperature, i.e. to c. 10°–25° C.

As the compositions used for fabricating prepregs in the practice of this invention are sensitive to UV radiation, it is absolutely essential that contacting as well as cooling be carried out excluding UV light. However, light of longer wavelengths, such as yellow light, may be present.

The prepreg material obtained after cooling can be rolled up or made up in any desired manner. If desired, it can be stored in this form, excluding UV light, at ambient temperature for months, typically for 5 to 15 months or even longer without suffering any loss in quality. Storage in a refrigerator is, of course, possible for an even longer period of time than at ambient temperature. However, the material can also be further processed immediately.

For further processing, the prepreg material is subjected to UV radiation, preferably to a wavelength of 200 to 450 nm, whereby it is converted into an activated form suitable for the cure at low temperature. Suitable light sources are typically Xenon lamps, argon lamps, tungsten lamps, carbon arc lamps, metal halide and metal arc lamps such as low pressure, medium-pressure and high-pressure mercury lamps or also lasers such as argon or crypton ion lasers. Radiation is preferably carded out with metal halide or high-pressure mercury lamps. The radiation time will depend on different factors, including the polymerisable organic material, the type of light source and the distance thereof from the irradiated material. The radiation time is preferably from 1 to 120 seconds.

In the above mentioned activated form, the material is still storable for some time, usually for 2 to 7 days at ambient temperature and for 3 to 5 weeks in a refrigerator.

Composite structures or laminates can be fabricated from the activated prepregs. Such composite structures may be planar boards and also mouldings of any shape, such as boats or parts of boats, masts for surf-boards, skis, tennis rackets or steering wheel frames.

The composite structures are fabricated by placing a layer of prepreg material either on a further layer, or on one layer, of another suitable material of any shape and repeating this procedure for as often as desired so as to form a laminate of the materials. Common examples of further materials are plastic or metal sheets, typically copper and aluminium foils, or further reinforcing agents such as mats or bonded fabrics made from fibrous reinforcing material.

Afterwards the laminate is compressed for 1 to 60 minutes at a temperature in the range from 50° to 140° C. to give the finished composite. The moulding pressure is normally from 0.3 to 60 bar. Those skilled in the art will know that the exact adjustment of the moulding parameters is also dependent on the material and must be optimised as necessary.

The prepregs of this invention are also suitable for the application of low and very low moulding pressures, typically 0.5 to 20 bar, preferably 0.5 to 10 bar. Pressures under 1 bar can also be applied in simple manner to the entire surface of irregularly shaped workpieces, conveniently by evacuating a suitable compression mould, for example a flexible hollow body into the interior of which the workpiece to be compressed is inserted, wholly or partially internally so that the hollow body fits snugly to the surface of the workpiece and the external air pressure acts as compression moulding pressure on the workpiece. Compression moulding can also be performed continuously in ribbon presses or also in multi-daylight presses (batchwise). Composites are preferably fabricated for 10 to 60 minutes, most preferably 10 to 20 minutes, in the temperature range from 80° to 120° C., preferably from 80° to 100° C.

The compounds containing one or more than one carboxyl group are added in the practice of this invention to the compositions based on epoxy resins and compounds of formula I because it has been found that, although such compositions can often be thermally cured to a certain degree at temperatures in the range from 60° to 140° C. even without the presence of these compounds, when such carboxyl group containing compounds are present this cure over the same time results in a crosslinking of unexpectedly greater density than that obtained in the same time without the carboxyl compounds. This is especially true of compositions which have a very high content of solid epoxy resins. The use of compounds which carry one or more than one carboxyl group for the above described purpose, i.e. as additive to compositions which consist of epoxy resins, preferably of a mixture of liquid and solid epoxy resins containing more than 50% by weight of solid epoxy resins, based on the total weight of the epoxy resins, compounds of formula I as defined hereinabove and optional customary modifiers, namely as additive which promotes the thermal crosslinking of the compositions exposed to UV radiation in the temperature range from 60° to 140° C., preferably 80° to 100° C., therefore also constitutes an essential part of this invention. Hence pregregs which are fabricated in the practice of this invention from curable compositions, and which contain carboxyl group containing polyesters, are usually cured to a extent of 90% and more after heating for 15 minutes to 100° C., whereas prepregs based on corresponding compositions without the polyesters or another carboxyl compound are cured only to an extent in the range from 70 to 80% after 60 minutes at 100° C. The extent of curing will be understood in this context as meaning one hundred times the difference between the enthalpy of reaction measured by differential scanning calorimetry (DSC) upon heating a completely fresh resin composition or a completely fresh prepreg and the enthalpy of reaction which is measured using a sample of the same type which has already been subjected to a cure under the given conditions, based on the first enthalpy of reaction.

The use of low molecular carboxyl compounds, conveniently of compounds having an equivalent weight of 45 to 250 g, preferably 45 to 100 g, per carboxy equivalent, has here the advantage that promotion of the reaction during the cure can be achieved even with a minor addition of the carboxy compounds, typically with 0.2 to 10% by weight. The use of lactic acid, adipic acid and fumaric acid is especially preferred.

The prepregs of this invention have excellent bonding strength on one another as well as on other materials, especially on metals such as copper, aluminium and aluminium alloys, or on plastics, especially on ABS, phenol-formaldehyde and melamine-formaldehyde condensates, cured epoxy resins and rubber.

The glass transition temperature ($T_G$) of the cured prepregs can be controlled by the skilled person on a suitable scale, as by the choice of suitable epoxy resins. To keep the thermal tensions in a composite structure low, it is often useful to try to achieve a glass transition temperature as low as possible, yet still sufficient, in view of the thermal stress to be expected on the composite. For ski, boat and bicycle construction it is very possible to use prepreg material with $T_G$ values down to 75°–80° C., whereas for making tennis rackets, prepreg material with higher $T_G$ values, typically 120°–140° C., can be more advantageous.

Unexpectedly, it has also been found that even prepreg material based on carbon fibres can be activated by UV radiation to such an extent that a cure is possible at the above stated temperatures. This is surprising because carbon absorbs UV radiation almost completely, i.e. a substantially more incomplete activation than when using fibrous material which is pervious to UV light. The invention therefore also relates to prepregs which contain a fibrous material that consists substantially of carbon itself, and which can be substantially fully cured in the temperature range from 60° to 140° C., preferably from 80° to 120° C.

EXAMPLE 1

53.9 parts by weight (in these Examples one part by weight corresponds to 1 g) of Araldit® GT 7071 (solid epoxy resin based on bisphenol A having a softening point of 77°–82° C. and an epoxy value of 1.9–2.0 equivalents per kilogram) are dissolved at a temperature of 120°–130° C. in 34.3 parts by weight of Araldit® LY 556 (liquid epoxy resin based on bisphenol A having an epoxy value of 5.25–5.40 equivalents per kilogram) and the mixture is well homogenised. After homogenisation, the mixture is cooled, with stirring, to 90° C. and 9.8 parts by weight are added of a carboxyl-terminated polyester of polytetrahydrofuran (number average molecular weight 1000), neopentyl glycol and fumaric acid which has a viscosity of 26 880 mPa.s (25° C.), an acid number of 63.3 mg KOH/g and a number average molecular weight of 4 300. Then 2 parts by weight of ($\eta^6$-cumene)($\eta^5$-cyclopentadienyl) Fe-II-hexafluoroantimonate are dispersed in the mixture at 75° C. in a Dispermat mixer under yellow light.

The following values were measured for the viscosity of this mixture:

| Temperature [°C.] | Viscosity [mPa · s] |
| --- | --- |
| 80 | 3360 |
| 100 | 1120 |
| 120 | 360 |

Its softening point is 5.9° C.

The same results are also obtained by not allowing the temperature of the mixture to fall below 120° C. during the above described process.

A glass fabric mat (Interglas IG 92146) is impregnated under yellow light with the hot mixture of 100°–120° C. After cooling, a slightly tacky, flexible prepreg having a resin content of c. 30–40% by weight is obtained. This prepreg can be stored at c. 23° C. for e.g. 15 months without loss of quality.

The prepreg is irradiated twice for 1 minute from a distance of 0.30 m with a 2000 watt UV lamp ("Staub" metal halide copying lamp ULTRALUX® 500 K). The activated prepreg can be storm for at least two days at 23° C. and for c. 3 weeks at 8° C. without loss of quality.

The same results are obtained by irradiating the prepreg twice for 10 minutes with a suitable 200 watt lamp at a distance of 0.10 m or twice in daylight from behind window glass for 1 hour.

The course of the thermal cure of an activated prepreg of the above composition is followed by differential scanning calorimetry (DSC) using a Mettier Thermoanalyser TA 4000-TC 11 with a DSC 25 measuring cell. Under yellow light, 10 to 20 mg of a freshly activated prepreg specimen or of activated prepreg specimens which are subjected to a thermal cure under the respective indicated conditions are placed in DSC measuring dishes. The dishes are sealed and heated at a heating up rate of 10° C./min. The machine indicates each time automatically the temperature at reaction peak and, after integration of the DSC peak, the enthalpy of reaction as well as the glass transition temperatures $T_{Go}$ (at the start of softening) and $T_G$ (temperature at the turning point of the step). From the difference between the enthalpy of reaction measured using a fresh specimen prepreg and the enthalpy of reaction measured using a specimen prepreg which has already been subjected to a specific cure, it is then possible to determine the degree of cure which can be achieved when curing under these conditions.

The following values are obtained:

| Temperature at reaction peak of the fresh prepreg specimen | | 101° C. | |
| --- | --- | --- | --- |
| Cure conditions | $T_{Go}$/ | $T_G$ | [°C.] degree of cure % |
| 15 min 100° C. | 73 | 80 | 95 |
| 60 min 100° C. | 86 | 95 | 96 |

It is seen that a 15 minute cure at 100° C. is virtually complete.

After a 15 minute cure at 100° C., the prepregs obtained in this Example have a lap shear strength on polished aluminium of 11.4N/mm² (determined in accordance with ISO 4587/79 at an overlap of 12.5 mm).

The roller peel strength after a 20 minute cure (incl. heating-up time) at a temperature of 100° C. determined in accordance with ISO 4578/79 is:

| on aluminium | 1.5 N/mm², |
| --- | --- |
| on rubber | 4.3 N/mm², |
| on ABS | 0.7 N/mm², |
| on PUR | 0.6 N/mm², |
| on PE, resin-coated | 3.8 N/mm², |

12 layers of the described prepregs are superposed on one another and compressed between release films in a press heated to 100° C. for 60 minutes edge to edge on a 3.2 mm spacer frame to a laminated board of appropriate thickness. The interlaminary shear strength of this laminated board according to ASTM D 2344/84 51.1±0.5 MPa.

Comparable results can also be obtained using a composition comprising 59.5 parts by weight of Araldit® GT 7071;30 parts by weight of Araldit® LY 556, 10 parts by weight of the polyester of Example 1 and 0.5 parts by weight of ($\eta^6$-cumene)($\eta^5$-cyclopentadienyl) Fe-II-hexafluoroantimonate.

EXAMPLES 2–4

The compositions listed in the following table are prepared as described in Example 1, using the same liquid and solid epoxy resin components and the same UV activator ($\eta^6$-cumene)($\eta^5$-cyclopentadienyl) Fe-II-hexafluoroantimonate.

|  | Example | | |
| --- | --- | --- | --- |
|  | 2 | 3 | 4 |
| parts by weight of liquid epoxy resin | 50 | 25 | 25 |
| parts by weight of solid epoxy resin | 50 | 60 | 60 |
| parts by weight of UV activator | 2 | 2 | 2 |
| parts by weight/type of carboxy compound | 1/ fumaric acid | 15/ Polyester A | 15/ Polyester B |

Polyester A=polyester from neopentyl glycol and adipic acid in the approximate molar ratio of 7 to 8; viscosity at 25° C.: 18000–25000 mPa.s; 1.25–1.43 acid equivalents per kilogram.

Polyester B=Polyester from polytetrahydrofuran (number average molecular weight 1000), neopentyl glycol and sebacic acid; viscosity at 25° C.: 26 880; number average molecular weight: 4 300; acid number 6.2 mg KOH per gram of polyester.

The following values for the temperature at reaction peak, the degree of cure $T_{Go}$ and $T_G$, the interlaminary shear strength, the lap shear strength on aluminium and the roller peel strength, are obtained in accordance with the particulars given in Example 1:

|  | Example | | |
| --- | --- | --- | --- |
|  | 2 | 3 | 4 |
| softening point [°C.] | 2.3 | 4.1 | — |
| temperature at reaction peak | 109 | 106 | 110 |
| degree of cure [%] | | | |
| 15 min/100° C. | — | 90 | 91 |
| 60 min/100° C. | 81 | 93 | 97 |
| $T_{Go}/T_G$ after cure at 60 min/100° C. [°C.] | 83/91 | 70/75 | 66/74 |
| interlaminary shear strength [N/mm$^2$] | 51.1 ± 0.5 | 32.9 ± 2.4 | 23.5 |
| lap shear strength on aluminium [N/mm$^2$] | — | 11.2 | 9.1 |
| roller peel strength [N/mm$^2$] | 1.3 ± 0.1 | — | — |

EXAMPLE 5

Fabrication of dry prepreg rovings (glass fibre strands impregnated with the "prepreg resin").

a) 75 parts by weight of Araldit® GT 7071 (solid epoxy resin based on bisphenol A having a softening point of 77°–82° C. and an epoxy value of 1.9–2.0 equivalents per kilogram) are dissolved at a temperature of c. 120° C. in 15 parts by weight of Araldit® LY 556 (liquid epoxy resin based on bisphenol A having an epoxy value of 5.25–5.40 equivalents per kilogram) and the mixture is well homogenised. After homogenisation, 10 parts by weight are added of a carboxyl-terminated polyester of polytetrahydrofuran (number average molecular weight 1000), neopentyl glycol and fumaric acid which has a viscosity of 26 880 mPa.s (25° C.), an acid number of 63.3 mg KOH/g and a number average molecular weight of 4 300. Then 2 parts by weight of ($\eta^6$-cumene)($\eta^5$-cyclopentadienyl) Fe-II-hexafluoroantimonate are dispersed in the mixture under yellow light.

The following values were measured for the viscosity of this mixture:

| Temperature [°C.] | Viscosity [mPa · s] |
| --- | --- |
| 100 | 5120 |
| 120 | 1480 |
| 130 | 860 |
| 140 | 520 | b) The entire impregnation of the glass fibre strand is carried out in a room with yellow light. The procedure comprises heating a metal double-walled funnel with circulating hot oil to c. 140° C. The funnel has a bottom exit nozzle of c. 1 mm diameter through which the glass fibre strand is led. About one meter below the nozzle is a means for winding the impregnated strand on to a cardboard bobbin. The above described composition is cooled, broken into pieces and placed in this form in the funnel, where the pieces immediately begin to melt on the walls of the funnel. When sufficient melt has collected above the nozzle, the glass fibre strand is guided through the nozzle and wound on to the cardboard bobbin. The resin penetrates the strand completely. Between the nozzle and the winding means, the strand is cooled by two cold air bellows so that it is dry and non-tacky and has a resin content of 22.7% by weight. Even after storage for several weeks at ambient temperature, the impregnated strand can be readily unwound from the cardboard bobbin without being destroyed.

c) Fabrication of a pipe by the filament winding method using the above described impregnated glass fibre strand.

The winding mandrel (diameter 40 mm) of a standard filament winding unit is preheated to 100° C. Instead of the customary impregnating bath, the filament winding unit is provided with a means with which the impregnated glass fibre strand can be unwound from the cardboard bobbin. Between this unwinding means and the hot mandrel there is a housing with a filament guide for the strand in the interior of which a medium-pressure mercury UV lamp and different reflectors are so positioned that the strand is uniformly irradiated from all sides. Then to a length of 30 cm four layers of strand are wound over one another, whereupon the impregnating composition becomes fluid again so that adjacent strands melt. The winding procedure is complete after about two minutes and even after a brief time the resin on the hot mandrel starts to gel. After 30 minutes the mandrel is removed, giving a transparent pipe whose glass transition temperature is 89° C. The reaction rate is 93° C.

This method has a number of particular advantages for the end user. The end user no longer necessarily has to impregnate the strands himself, as has been standard practice heretofore, but simply obtains the impregnated storable fibrous material from a supplier. He suffers no resin losses because of too short or wongly calculated shelf lives and unused resin residues, and only very brief curing times are necessary at what are still relatively low curing temperatures. But also those who impregnate fibrous material for themselves or for reselling derive advantage from the use of the novel compositions, as these are generally single component mixtures, so that no inhomogeneity of resin and hardener can occur that could lead to fluctuations in the properties of the prepreg material.

What is claimed is:

1. A process for the production of a storage stable prepreg, which process does not involve a B-staging of a curable resin composition and comprises a) heating a curable resin composition, which is solid at ambient temperatures and which contains less than 2% by weight of solvents, more than 45% by weight of substances which are solid at least at ambient temperature or at a lower temperature, and which, in addition to comprising customary modifiers, comprises solid epoxy resins or a mixture of liquid and solid epoxy resins, at least one initiator which is sensitive to UV radiation for the polymerization of the epoxy resins and has the formula I $$[R^1(Fe^{II} R^2)_a]^{ab\oplus}ab\cdot[X]^{\ominus} \qquad (I)$$

wherein a and b are each independently of the other 1 or 2; $R^1$ is a $\pi$-arene, $R^2$ is a $\pi$-arene, an indenyl anion or a cyclopentadienyl anion; $[X]^{\ominus}$ is an anion $[LQ_m]^{\ominus}$ or the anion of a partially fluorinated or perfluorinated aliphatic or aromatic sulfonic acid; L is B, P, As or Sb; Q is F, with the proviso that some of the radicals Q may also be hydroxyl groups; and m is the valency of L increased by one; and at least one further compound selected from the group consisting of carboxylic acid and polyesters which contain one or more than one carboxyl group and mixtures thereof, excluding UV light, to a temperature which is in the range from 60° to 140° C. and is at least sufficiently high that the composition has a viscosity not higher than about 3,500 mPa.s;

b) bringing said heated composition into intimate contact with a fibrous material, while continually excluding UV light;

c) cooling said resulting fibrous material to at least a temperature at which the curable composition solidifies, continually excluding UV light; and d) activating the resulting cooled fibrous material for a thermal cure either after initial storage excluding UV light or immediately by exposure to UV radiation.

2. A process according to claim 1, wherein the curable resin composition contains 60 to 98% by weight of epoxy resins.

3. A process according to claim 2, wherein the content of solid epoxy resins in the curable resin composition is greater than 50% by weight, based on the total weight of the epoxy resins.

4. A process according to claim 1, wherein the curable resin composition contains as liquid epoxy resins either glycidyl esters or diglycidyl ethers which are derived from 2,2-bis-(4-hydroxyphenyl)propane (bisphenol A) or from bis(4-hydroxyphenyl)methane (bisphenol F).

5. A process according to claim 1, wherein the curable resin composition contains as solid epoxy resins polyglycidyl ethers which are derived form 2,2-bis(4-hydroxyphenyl)propane (bisphenol A), bis(4-hydroxyphenyl)methane (bisphenol F) or from epoxy novolaks.

6. A process according to claim 5, wherein the curable resin composition contains as solid epoxy resins polyglycidyl ethers which are derived from epoxy phenyl and epoxy cresol novolaks.

7. A process according to claim 1, wherein the compound carrying one or more than one carboxyl group is selected from fumaric acid, lactic acid and adipic acid.

8. A process according to claim 1, wherein the compound carrying one or more than one carboxyl group is a carboxyl-terminated polyester with on average at least two carboxyl groups per molecule.

* * * * *